Oct. 13, 1970     J. R. KENCH ET AL     3,533,860

MAGNETOSTRICTIVE MATERIAL AND ELEMENTS

Filed May 31, 1968     4 Sheets-Sheet 1

INVENTORS
JOHN R. KENCH
JACK A. SARTELL
BY
ATTORNEY.

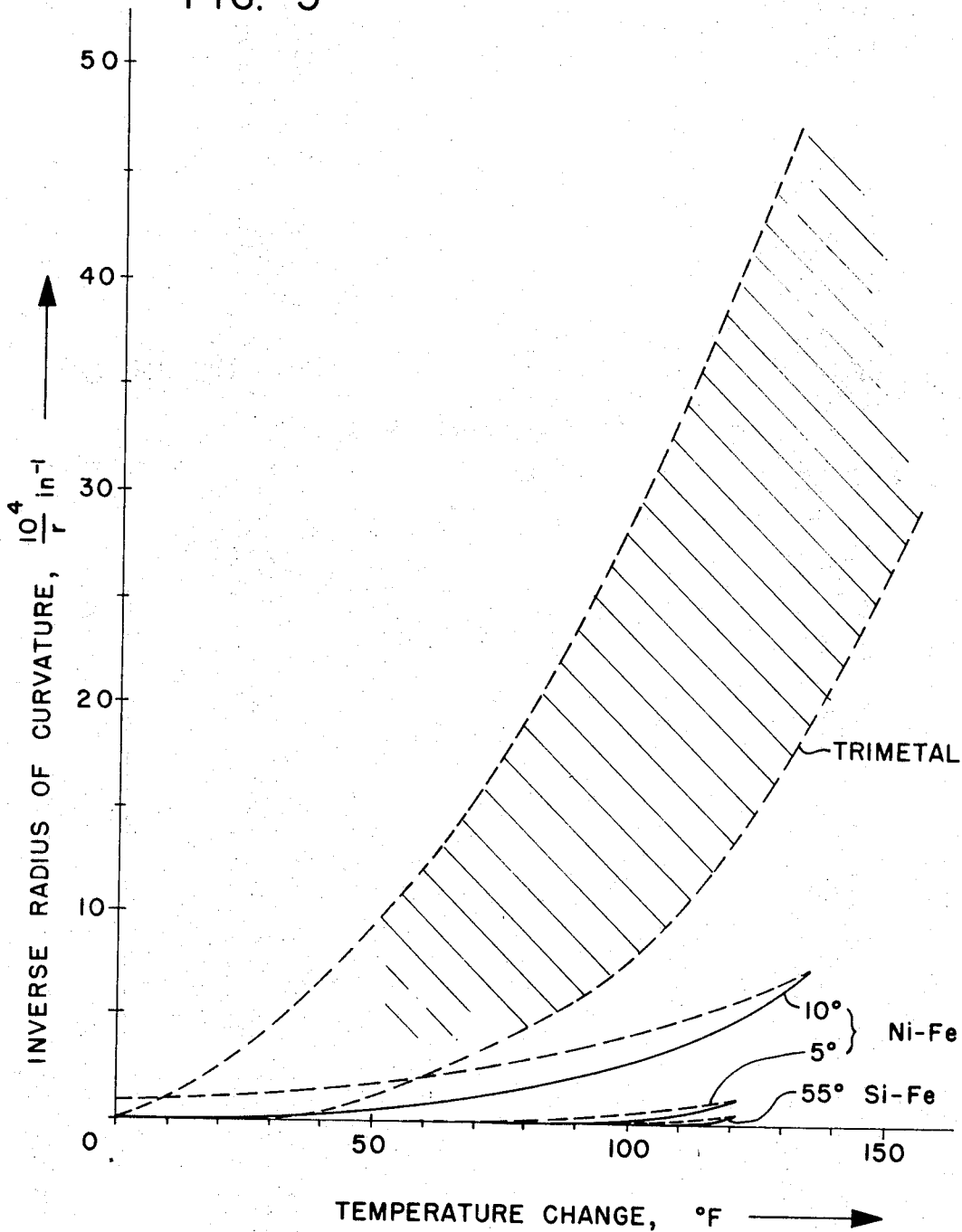

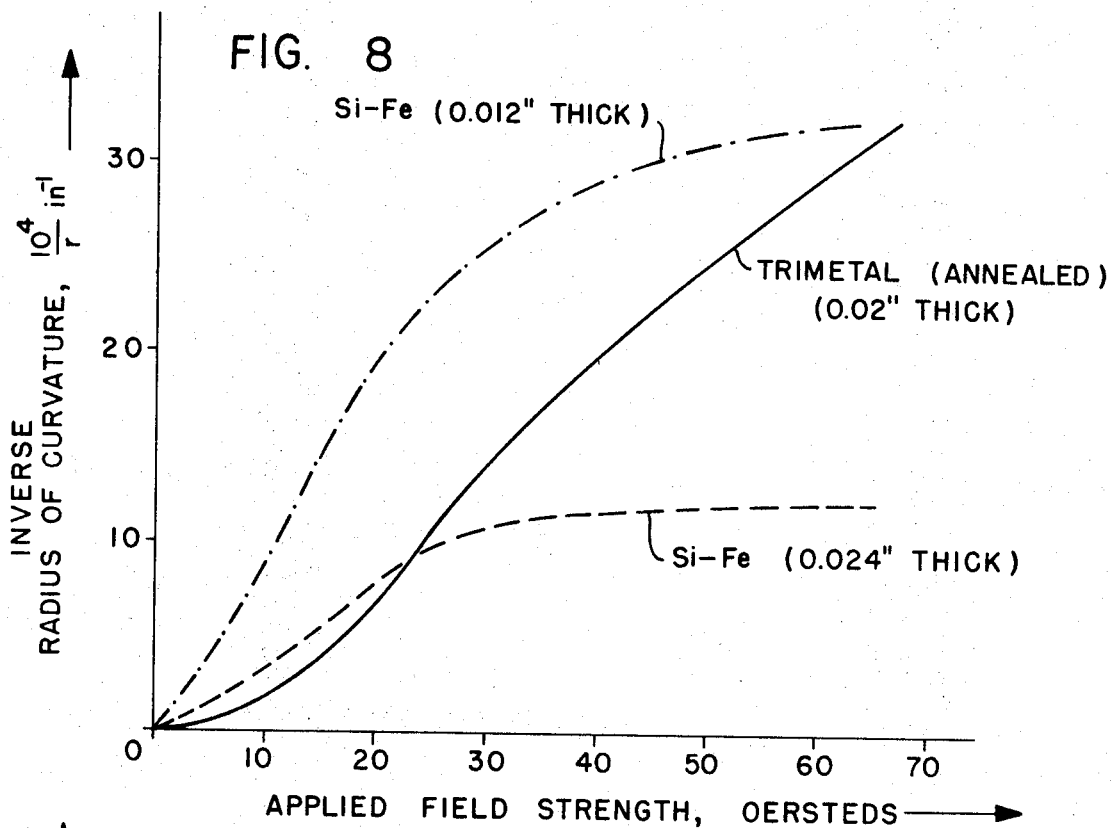
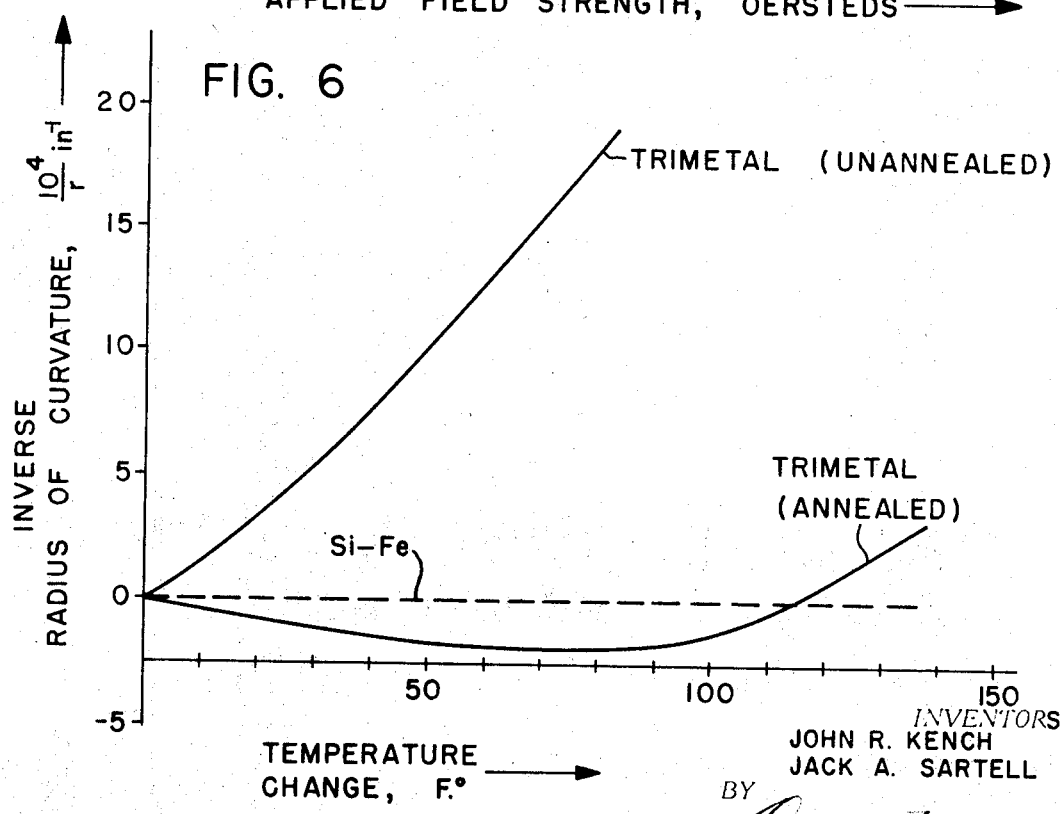

United States Patent Office 3,533,860
Patented Oct. 13, 1970

3,533,860
MAGNETOSTRICTIVE MATERIAL
AND ELEMENTS
John R. Kench, Minneapolis, and Jack A. Sartell, Minnetonka, Minn., assignors to Honeywell Inc., Minneapolis, Minn., a corporation of Delaware
Filed May 31, 1968, Ser. No. 733,651
Int. Cl. H01v 9/02; B32b 5/18
U.S. Cl. 148—31.55                                15 Claims

ABSTRACT OF THE DISCLOSURE

A laminated magnetostrictive material consisting of laminations of the same polycrystalline material having different "grain texture." The material is inherently temperature insensitive.

BACKGROUND OF THE INVENTION

This invention pertains to laminated magnetostrictive material and magnetostrictive elements prepared therefrom. Under the influence of a magnetic field magnetostrictive elements exhibit a bending or flexing action. This action may be used in a switch, as one example of many uses. In such a device the element is ordinarily supported at one end with the other end free to move. The free end carries an electrical contact. Another contact is supported on a stationary structure adjacent the first contact. Upon energization of a coil or other magnetic field producing means the element flexes to engage the contacts. Many other uses and structures are also possible as will be apparent to those familiar with this art.

Since each lamination or layer of the conventional polycrystalline composite materials used in magnetostrictive elements, commonly referred to as magnetostrictive bimetals, has a different coefficient to thermal expansion, a change in the ambient temperature also effects flexing of the element without an energizing magnetic field. The conventional laminated magnetostrictive materials and elements prepared therefrom are therefore temperature sensitive and exhibit undesirable thermal deflections or tmperature effects.

From a commercial standpoint, the most successful and widely accepted approach for offsetting thermal effects to date has been provided by the "trimetal" approach wherein the thermal flexures of the polycrystalline laminated material are compensated by the addition of a counteracting layer. An example of this approach is described in U.S. Pat. 3,378,357. Data on such commercially available materials, however, indicate that thermal effects, although reduced to a certain extent, still prove troublesome. This approach will be discussed in more detail hereinbelow.

A more basic approach for eliminating thermal effects in magnetostrictive laminated materials is indicated in U.S. Pat. 2,782,280 wherein the anisotropic magnetostrictive properties of a cubic single crystal material, in which different strains are induced in different crystal directions by any given applied field, are employed. A laminated material prepared with two layers of the same single crystal material, each layer having different crystallographic orientation, is suggested in that patent. On a theoretical basis such a material should be free from temperature effects. Insofar as can be determined, this approach has not found commercial application. Therefore, no data is available on the properties of single crystal laminated material of this type.

On a theoretical basis at least, the inherent elimination of thermal effects suggested by the single crystal approach appears to offer a potentially satisfactory solution to the problem of temperature sensitivity. There is however a drawback in that the use of single crystal materials requires a high degree of lattic perfection, a high degree of structural unformity and a high degree of chemical purity, making the manufacture of such a laminated material intricate, difficult and expensive. Limitations in the variety of desirable magnetostrictive materials available in single crystal form and the limitations on the size of the layers taken from single crystals are also drawbacks to this approach.

SUMMARY OF THE INVENTION

This invention, utilizing the basic approach, has eliminated the need for single crystal magnetostrictive materials by successfully employing layers or laminations of highly textured, polycrystalline, cubic magnetostrictive materials to produce a laminated magnetostrictive composite material. The layers are of the same material with regard to composition in the laminated material, but the crystals in each layer or lamination are aligned in different relative directions. Thus each layer exhibits anisotropic magnetostrictive characteristics. At the same time, the temperature expansion characteristics of these layers are isotropic. As a result, the invention provides a magnetostrictive laminated material having negligible temperature sensitivity at an attractive cost and with a minimum of manufacturing complications.

The terms (100), (110) and (111) as used herein refer to "crystal directions." When a cubic magnetostrictive material in sheet form contains a substantial number or majority of the crystals oriented to present similar crystal directions in a particular direction in the plane of the sheet it is described herein as being "textured." For example, if a material exhibits a substantial amount of (111) crystal directions in the axial direction of the sheet, it is referred to as having a (111) texture. When the grains or crystals of a material are similarly oriented for the most part in the plane of the textured sheet, it is referred to herein as being "aligned," "axially aligned" or "highly textured."

BRIEF DESCRIPTION OF THE DRAWING

FIG. 5 is a graph comparing the temperature deflection observed for elements using the laminated material prepared according to this invention with a representative, commercially available trimetal element;

FIG. 6 is a graph comparing the temperature deflections observed for 3 inch long, 0.020 inch thick elements using the material prepared according to this invention with representative trimetal elements;

FIG. 8 is a graph comparing the magnetic deflections observed for 3 inch long elements using the material prepared according to this invention with representative trimetal elements.

DESCRIPTION OF THE PREFERRED EMBODIMENTS

Figure 4:
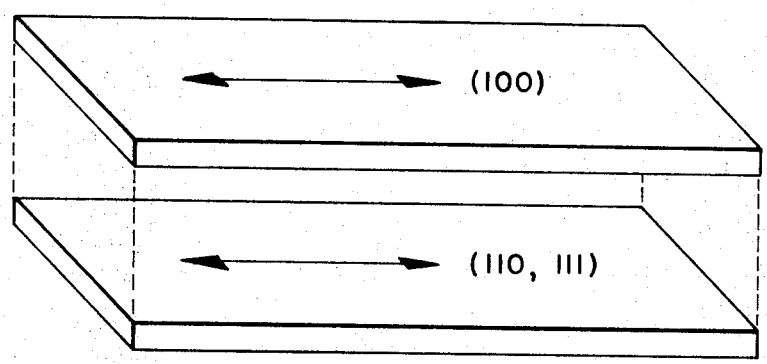
FIG. 4 is an exploded illustration of the laminated magnetostrictive material according to this invention.

As previously stated, according to this invention highly textured, cubic, polycrystalline, magnetostrictive materials are used to produce laminated magnetostrictive materials having negligible temperature sensitivity. In sheet form certain polycrystalline cubic materials possess the required crystalline magnetostrictive anisotropy due to the presence of preferred grain orientation. Optimum magnetostrictive deflection in these cubic materials is obtained by opposing (111) oriented layers or laminations with (100) oriented ones, although opposing (110) and (100) layers is also acceptable. The problem in using textured polycrystalline material instead of single crystal material lies in finding textured sheet which exhibits substantial (100) and (111) or (110) alignment in material of the same composition. The arrangement of the laminations to provide the laminated material is schematically shown in FIG. 4 and will be discussed in more detail below.

FACE-CENTERED CUBIC MATERIALS

Generally, crystal textures can be induced in polycrystalline sheets by either severe cold working procedures or recrystallization of the rolled plate. However, the two textures are normally quite different in the face-centered cubic materials such as the 50% nickel-50% iron and 50% nickel-50% cobalt alloys. The face-centered cubic materials frequently show an "alpha-brass" texture, similar to that shown in FIG. 1, in the "as-rolled" condition which transforms to a "cube" texture, similar to that shown in FIG. 2, on recrystallization. Therefore, in face-centered cubic materials, the (111) alignment may be obtained in the rolling direction of rolled sheet while the (100) alignment may be obtained in the rolling direction of recrystallized sheet of the same material. The two alignments do not occur together in the same sheet. For example, "alpha-brass" texture is exhibited by rolled alloys, such as the 50% nickel-50% iron and the 50% nickel-50% cobalt alloys, giving the (111) alignment in the plane of the as-rolled sheet. These alloys, particularly the 50% nickel-50% iron alloy may also be heat treated to effect recrystallization and provide the (100) alignment in the plane of the sheet, due to the appearance of the "cube" texture.

In the case of the 50% nickel-50% iron alloy, it happens in the "as-rolled" texture that the (111) alignment exists in the plane of the rolled sheet at about 10° to the rolling direction and at right angles to it while very marked (100) alignment is found in recrystallized sheets in directions both parallel and perpendicular to the rolling direction.

Figure 1:
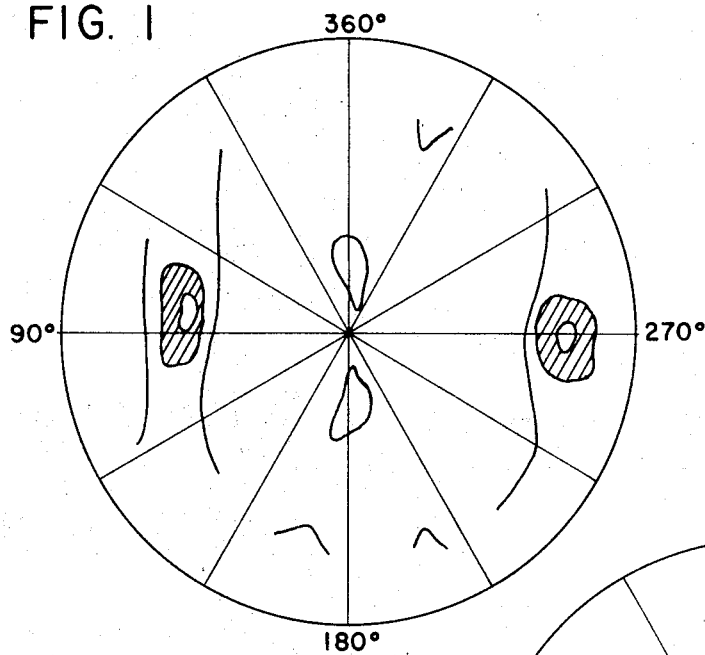
FIG. 1 shows the (110) pole figure for a 50% nickel-50% iron alloy in the "as-rolled" condition, the rolling direction being 270°.
Figure 2:
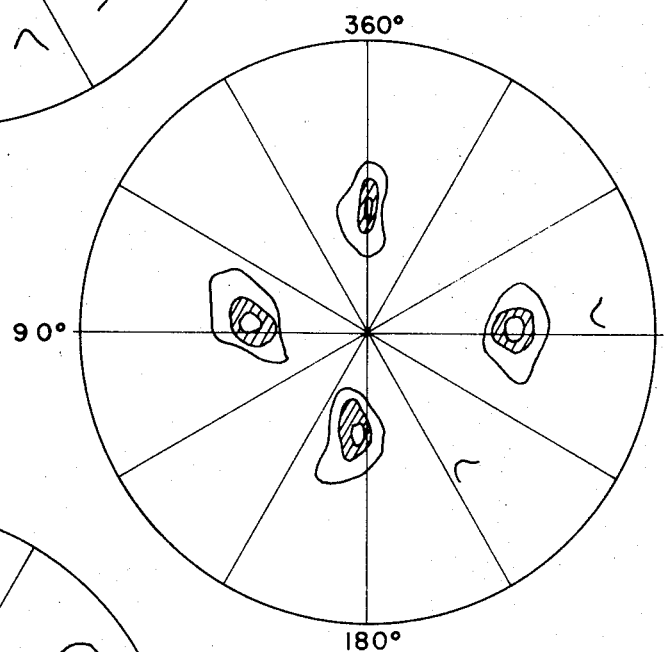
FIG. 2 shows the (110) pole figure for the 50% nickel-50% iron alloy of FIG. 1 after two hours annealing at 1200° F., the rolling direction being 270°.

FIGS. 1 and 2 respectively show the (110) pole figures measured on 50% nickel-50% iron, respectively "as-rolled" and after two hours of annealing at 1200° F. It can be seen that the distribution of (110) poles is drastically changed as a result of annealing and that the expected "cube" texture replaces the "alpha-brass" texture. Pole figures are essential in this regard to determine crystal direction relative to rolling direction.

BODY-CENTERED CUBIC MATERIAL

Figure 3:
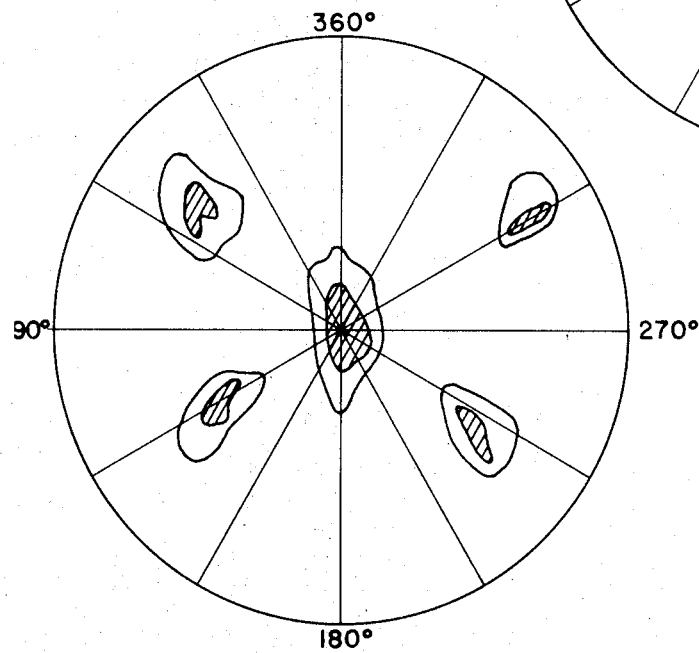
FIG. 3 shows the (110) pole figure for a 3% silicon-iron alloy, the rolling direction being 270°.

Other textured polycrystalline sheet materials exhibit suitable crystalline orientations when in the fully annealed condition. In certain body-centered cubic materials, it has been found that both the (111) and (100) alignment may be obtained together in the same sheet. For example, silicon-iron alloys and pure iron may be obtained which exhibit the "cube-on-edge" texture, as shown in FIG. 3, containing strongly aligned (100) and (111) crystal directions in the plane of the sheet. Silicon-iron sheet containing about 1–3% silicon may be readily obtained in the recrystallized condition. A (110) pole figure is shown in FIG. 3 for a 3% silicon, balance essentially iron alloy. In this instance (100) pole concentrations are to be found in the rolling direction while a (111) pole concentration exists at about 55° to the rolling direction.

JOINING TECHNIQUES

From the preceding it can be seen that a laminated material of 50% nickel-50% iron layers or laminations, prepared according to this invention with one layer from "as-rolled" sheet and one layer from recrystallized sheet, will exhibit magnetostrictive flexing with negligible thermal effects. However, the laminated material must be formed at a temperature below about 1200° F., otherwise the rolled layer will recrystallize and the magnetostrictive properties of the composite might be lost. Extensive recrystallization studies show that an operating temperature of about 1000° F. is satisfactory for times up to two hours. Such a low temperature rules out brazing and diffusion bonding processes for preparing laminated material from these particular constituents. Of the remaining joining techniques, soldering and the use of organic adhesives are unlikely to produce the best bonds.

Pressure welding under loads of about 10,000 to 40,000 pounds at about 1000° F. has been found to be a preferred joining technique for preparing laminated material from 50% nickel-50% iron layers or laminations. This technique invariably produces satisfactory bonds without noticeable distortion. The amount of load and exact temperature used are not critical so long as recrystallization and excessive deformation is avoided. A series of samples 0.02 inch thick and 3 inches long were prepared from this alloy in which recrystallized layers taken from sheet parallel to the rolling direction were joined to layers taken from cold-worked sheet at angles of 0°, 5°, 10°, 15° and 90° from the rolling direction. These layers were joined so that one layer overlayed at least part of the other layer to form a laminated material. A preferred composite material is shown schematically in FIG. 4 wherein one layer is made up substantially of crystals oriented axially in the (100) direction while the other layer is made up substantially of crystals oriented axially in the (111) direction as illustrated by the arrows, the (111) being preferred for maximum magnetostrictive effect. The component layers are intimately secured together along their contiguous surfaces so that a change in length of one layer causes flexing in elements prepared from the laminated material. It should be noted that only elements having a simple flat rectangular configuration are described for the sake of simplicity. However, the invention is not limited to such configurations since many others can be prepared from this laminated material as will be readily apparent to those familiar with this art.

The pressure welding joining technique was also used to fabricate 0.012 inch thick laminated material from 0.006 inch thick, 3 inch long layers taken from 3% silicon-iron sheet at 0° and 55° to the rolling direction. Since alloys of the type illustrated by 3% silicon-iron are fully recrystallized or fully annealed, other joining techniques such as welding or brazing may also be employed to form the laminated material because temperatures in the range of 1400° F. to 1650° F. will not affect the texture of this alloy. Another preferred joining approach is described in a copending application filed of even date herewith entitled "Iron-silicon Magnetostrictive Laminated Material and Elements" in the names of John R. Kench and Allan Pierskalla.

The silicon-iron layers were also joined together along their contiguous surfaces as schematically shown in FIG.

4 such that one layer was substantially made up of crystals oriented axially in the (100) direction while the other layer was substantially made up of crystals axially oriented in the (111) direction as illustrated by the arrows. The laminated composite material thus provided flexes when one layer undergoes a change in length due to magnetic field effects.

COMPARATIVE DATA

All of the comparative data reported was obtained by mounting cantilevered elements centrally along the horizontal axis of a 15 inch cube-coil, the windings being built up outside a hollow asbestos-board box. By means of a non-inductively wound heater and externally driven fan, the temperature of the asbestos-board box can be controlled to within plus or minus ¼° F. The magnetic field was found to be effectively constant to 0.1 oersteds over a 6 inch sphere containing the element. The cantilever element under test had a light mirror affixed to the free end, using double-backed pressure sensitive tape and was located close to an adjustable reference mirror. By means of an optical Tuckerman gauge, the angle between the element mirror and the reference mirror could be measured to an accuracy of $2 \times 10^{-5}$ radians and the deflection of the beam perpendicular to the cube axis could be measured as function of magnetic field strength parallel to the element or as a function of temperature variation.

For comparative purposes, a trimetal element made up of a nickel layer, a 50% nickel-50% iron alloy layer, and a compensating steel layer was selected as representative of the better commercially available laminated magnetostrictive material. The thickness of the layers were respectively 0.0090 inch, 0.0097 and 0.0013 inch while their width was 0.187 inch and their length was 3 inches.

THERMAL DEFLECTION MEASUREMENTS

The results of applying temperature cycles to the 50% nickel-50% iron elements prepared according to this invention are shown in FIG. 5 compared with the temperature flexures noted for the representative trimetal material. As can be seen, the nickel-iron elements produced from rolled material cut at 5° to the rolling direction exhibit no significant flexure at all, even on repeated temperature cycling. Samples cut at 10° exhibit thermal effects which are comparable with the thermal effects shown for an annealed trimetal material. The thermal effects exhibited by the 10° sample are possibly explained by the presence of internal stresses in the layers or laminations. These stresses can be removed by appropriate annealing.

As can also be seen from this figure, no temperature flexures are noted in the 3% silicon-iron elements prepared from laminated material according to this invention where both laminations are of stress-free recrystallized or fully annealed sheet material.

In complete fairness to the trimetal approach, it should be noted that the temperature stability of the trimetal described herein as representative can be improved to a degree by annealing. In FIG. 6, the annealed and unannealed temperature stability of a trimetal element is compared to that of a silicon-iron element prepared in accordance with this invention. Although the temperature stability of the silicon-iron element is unsurpassed, the annealed trimetal element is definitely improved as compared to the unannealed trimetal element. All samples were 3 inches long in this experiment.

MAGNETIC DEFLECTION MEASUREMENTS

Figure 7:
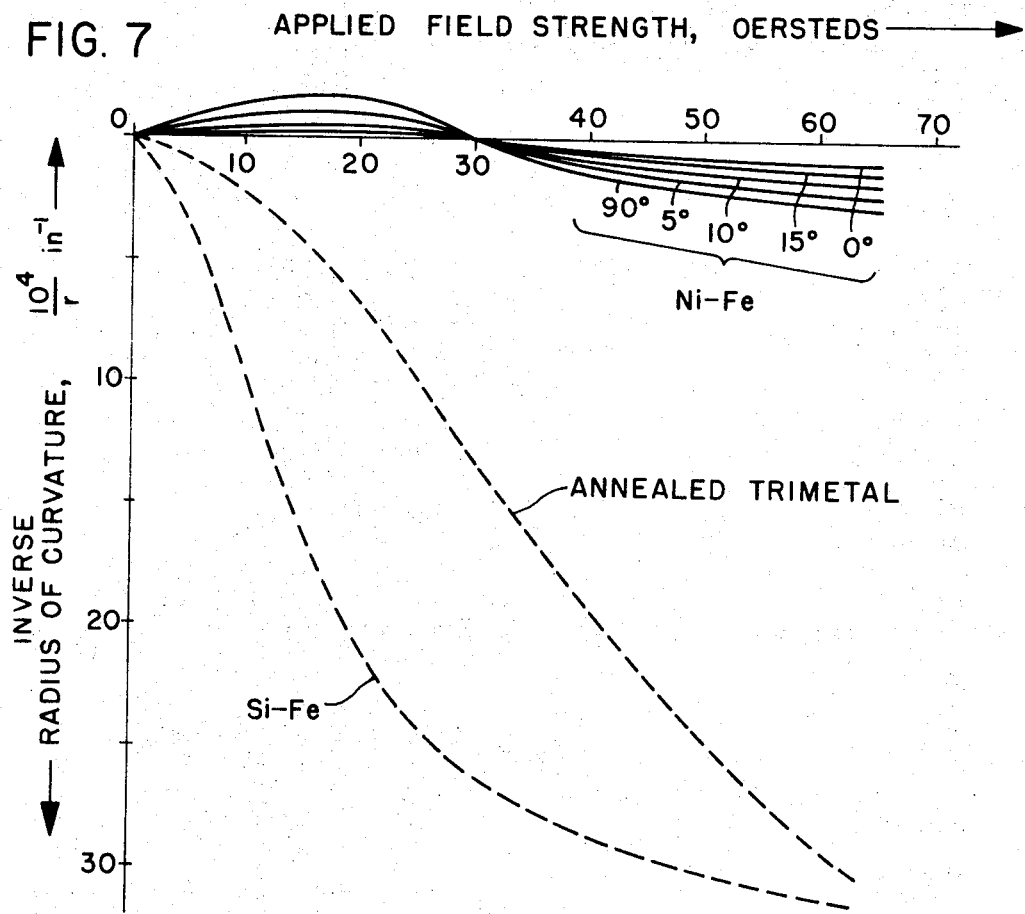
FIG. 7 is a graph comparing the magnetostrictive deflection observed for elements using the material prepared according to this invention with a trimetal element.

In FIG. 7 the magnetostrictive deflection observed in a 3% silicon-iron element and various 50% nickel-50% iron elements, prepared from laminated material according to this invention, are shown. The deflections in the nickel-iron elements are small compared to the best trimetal results and in addition exhibit a reversal in direction at about 25 oersteds. By contrast, the magnetic deflections measured for the 3% silicon-iron element are larger than those observed in the trimetal element, especially at low applied fields. Up to 20 oersteds, deflections in 3% silicon-iron elements are about 3 times greater under comparable magnetic conditions. This laminated material is of great practical interest. Its magnetostrictive flexures at low fields together with insignificant temperature sensitivity makes it a preferred magnetostrictive laminated material.

Apart from the advantage of the magnetostrictive materials prepared in accordance with this invention over the trimetal approach in terms of temperature stability, an important factor to be considered is the fact that trimetal materials, due to certain fabrication procedures, are limited in flexure because they cannot be produced satisfactorily with over-all thicknesses of less than about 0.020 inch. On the other hand, laminated material in accordance with this invention may be made much thinner as evidenced by the silicon-iron material described above which is 0.012 inch thick.

This is important because flexure is inversely proportional to material thickness, other things being equal. While a 0.020 inch thick trimetal material may out-perform a 0.020 inch laminated material prepared according to this invention, the 0.012 inch laminated material of this invention will provide larger deflection at low magnetic fields. For example, in FIG. 8 the deflections of 0.024 inch thick and 0.012 inch thick silicon-iron elements in accordance with this invention are compared to the deflection observed in a representative 0.020 inch thick trimetal element of the type described previously, which was annealed to improve its properties. As can be seen, the thin 0.012 inch silicon-iron element provides significantly greater deflection than does the trimetal element. All elements were 3 inches long for this experiment.

It is readily apparent to those skilled in the art that many modifications of this invention are possible. It should therefore be understood that the invention is not to be limited by the embodiments shown, but only by the scope of the following claims.

The embodiments of the invention in which an exclusive property or right is claimed are defined as follows:

1. A laminated magnetostrictive material comprising at least two polycrystalline laminations of magnetostrictive material, the laminations being of the same material but containing different crystal alignments and being arranged in substantial surface to surface contact and secured together so that the laminated material will flex in response to a magnetic field.

2. A magnetostrictive element including a laminated magnetostrictive material according to claim 1.

3. The laminated material of claim 1 wherein the material for the laminations is selected from the group consisting of the textured body-centered cubic materials and the textured face-centered cubic materials.

4. The laminated material of claim 3 wherein the material for the laminations is a body-centered cubic metal in sheet form having a predominant axial alignment of (100) crystal directions in one lamination and a predominant axial alignment of (111) crystal directions in the other lamination.

5. The laminated material of claim 4 wherein the metal is a silicon-iron alloy.

6. The laminated material of claim 5 wherein the alloy is predominantly iron.

7. The laminated material of claim 6 wherein the alloy is about 1–3% silicon, balance essentially iron.

8. The laminated material of claim 7 wherein the alloy is about 3% silicon, balance essentially iron.

9. The laminated material of claim 8 wherein one of the laminations is taken from a substantially fully annealed sheet of the alloy in a strip oriented at about 0° to the rolling direction and the other lamination is taken from a substantially fully annealed sheet of the alloy in a strip oriented at about 55° to the rolling direction.

10. The laminated material of claim 3 wherein the material for the laminations is a face-centered cubic metal in sheet form having a predominant axial alignment of the (100) crystal directions in one lamination and a predominant axial alignment of crystal directions selected from the group consisting of (110) and (111) crystal directions in the other lamination.

11. The laminated material of claim 10 wherein the alignment of the other lamination is of the (111) type.

12. The laminated material of claim 10 wherein the metal is a textured nickel-iron alloy.

13. The laminated material of claim 12 wherein the alloy is about 50% nickel and about 50% iron.

14. The laminated material of claim 13 wherein one of the laminations is taken from a strip oriented substantially parallel to the rolling direction of a sheet of substantially fully annealed alloy, and the other lamination is taken from a strip oriented at from about 5° to about 15° to the rolling direction of a sheet of the as-rolled alloy.

15. The laminated material of claim 14 wherein the other lamination is taken from a strip oriented at about 90° to the rolling direction of the sheet.

References Cited

UNITED STATES PATENTS

| | | | |
|---|---|---|---|
| 2,782,280 | 2/1957 | Bickford | 310—26 X |
| 2,880,498 | 4/1959 | Tarlton | 29—196.1 |
| 3,209,181 | 9/1965 | Brockman et al. | 310—26 |
| 3,256,738 | 6/1966 | Giacomo et al. | 310—26 X |
| 3,378,357 | 4/1968 | Alban | 29—195.5 X |

L. DEWAYNE RUTLEDGE, Primary Examiner

G. K. WHITE, Assistant Examiner

U.S. Cl. X.R.

29—195.5, 196, 196.1, 196.6; 148—31.57; 310—26